(12) United States Patent
Martins et al.

(10) Patent No.: US 9,441,578 B2
(45) Date of Patent: Sep. 13, 2016

(54) GAS DISTRIBUTION MANIFOLD AND CORRESPONDING GAS INTAKE MODULE

(75) Inventors: Carlos Martins, Le Chesnay (FR); Jose Borges-Alejo, Paris (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 386 days.

(21) Appl. No.: 13/883,949

(22) PCT Filed: Nov. 7, 2011

(86) PCT No.: PCT/EP2011/069576
§ 371 (c)(1),
(2), (4) Date: Jul. 16, 2013

(87) PCT Pub. No.: WO2012/062715
PCT Pub. Date: May 18, 2012

(65) Prior Publication Data
US 2013/0291842 A1 Nov. 7, 2013

(30) Foreign Application Priority Data
Nov. 8, 2010 (FR) .................................... 10 59205

(51) Int. Cl.
*F02M 25/07* (2006.01)
*F02B 29/04* (2006.01)
(Continued)

(52) U.S. Cl.
CPC ........ *F02M 25/072* (2013.01); *F02B 29/0475* (2013.01); *F02M 35/10222* (2013.01); *F02M 35/116* (2013.01); *Y02T 10/121* (2013.01); *Y02T 10/146* (2013.01)

(58) Field of Classification Search
CPC .................. F02M 35/10222; F02M 25/0724; F02M 25/0735; F02M 25/0722; F02M 25/0737; F02M 25/0723; F02M 25/0748; F02M 25/0751; F02M 25/0719; F02M 25/0731; F02M 35/10078; F02M 35/10262; F02M 35/10288; F02M 35/10354; F02M 25/07

USPC ............ 123/184.21, 184.25, 184.47, 184.48, 123/568.13, 568.17, 184.31, 184.34
See application file for complete search history.

(56) References Cited

U.S. PATENT DOCUMENTS 4,269,158 A * 5/1981 Berti .................. F02B 29/0462
123/563
4,445,487 A * 5/1984 Higashi .................... 123/568.17
(Continued)

FOREIGN PATENT DOCUMENTS

EP 1069301 A2 * 1/2001 ................ F02F 1/38
EP 1122421 A2 8/2001
(Continued)

OTHER PUBLICATIONS

English language abstract for EP1122421 extracted from espacenet.com database Jul. 18, 2013, 3 pages.
(Continued)

*Primary Examiner* — Marguerite McMahon
*Assistant Examiner* — Tea Holbrook
(74) *Attorney, Agent, or Firm* — Howard & Howard Attorneys PLLC

(57) ABSTRACT

A manifold distributes gases into intake ducts of a motor vehicle combustion engine. The intake ducts are distributed in at least two distant groups, each duct of one group supplying one and the same cylinder of the engine as a duct of the other group. The manifold includes a manifold casing through which a flow of intake gases can flow, and an injection duct for injecting a flow of recirculated exhaust gases into the flow of intake gases. The casing is capable of directing the flow of intake gases and the flow of recirculated exhaust gases toward the intake ducts of the engine, and the injection duct is arranged inside the manifold casing so as to be able to be positioned between the two groups of intake ducts.

16 Claims, 2 Drawing Sheets

(51) Int. Cl.
   *F02M 35/10* (2006.01)
   *F02M 35/116* (2006.01)

(56) References Cited

U.S. PATENT DOCUMENTS

| | | | | |
|---|---|---|---|---|
| 4,513,698 A * | 4/1985 | Senga | F02B 19/1028 123/184.36 |
| 4,615,324 A * | 10/1986 | Choushi et al. | 123/568.17 |
| 4,715,329 A * | 12/1987 | Yasuda | F02M 25/06 123/184.36 |
| 5,014,654 A * | 5/1991 | Ishibashi | 123/184.38 |
| 5,094,194 A * | 3/1992 | Rush, II | F02B 27/00 123/184.42 |
| 5,121,734 A * | 6/1992 | Grieshaber | F02B 47/08 123/568.17 |
| 5,209,191 A * | 5/1993 | Kopec | F02M 35/10078 123/184.45 |
| 5,490,488 A * | 2/1996 | Aversa | F02B 75/22 123/184.31 |
| 5,551,385 A * | 9/1996 | Yoshida | F02B 61/045 123/184.21 |
| 5,896,838 A * | 4/1999 | Pontopiddan | F02M 35/10039 123/184.47 |
| 5,957,116 A * | 9/1999 | Haegele et al. | 123/568.12 |
| 5,960,759 A * | 10/1999 | Ohsuga et al. | 123/184.31 |
| 6,422,221 B2 | 7/2002 | Pietrowski et al. | |
| 6,474,305 B1 * | 11/2002 | Kimura | 123/456 |
| 6,966,310 B2 * | 11/2005 | Moren | F01M 13/022 123/184.54 |
| 7,237,541 B2 * | 7/2007 | Vanderveen et al. | 123/568.17 |
| 7,246,593 B2 * | 7/2007 | Murphy | F02D 9/08 123/184.57 |
| 7,513,812 B1 * | 4/2009 | Hochmayr | B63B 21/14 123/192.2 |
| 8,011,352 B2 * | 9/2011 | Shinkai | F02M 25/0703 123/568.17 |
| 8,051,843 B2 * | 11/2011 | Matsudaira | 123/568.17 |
| 8,210,146 B2 * | 7/2012 | Horie | F02M 35/10085 123/184.31 |
| 8,499,748 B2 * | 8/2013 | Braic et al. | 123/568.17 |
| 8,677,982 B2 * | 3/2014 | Marimbordes et al. | 123/563 |
| 2009/0044930 A1 * | 2/2009 | Hazelton et al. | 165/136 |
| 2009/0223476 A1 * | 9/2009 | Shinkai et al. | 123/184.21 |
| 2009/0293829 A1 * | 12/2009 | Horie et al. | 123/184.21 |
| 2009/0293831 A1 * | 12/2009 | Harada | 123/184.53 |
| 2010/0154759 A1 * | 6/2010 | Taira | F02M 13/00 123/568.17 |
| 2012/0103296 A1 * | 5/2012 | Konakawa | F02D 9/1095 123/184.56 |
| 2013/0167814 A1 * | 7/2013 | Martins | F02M 35/10078 123/568.17 |

FOREIGN PATENT DOCUMENTS

| | | | | |
|---|---|---|---|---|
| FR | 2908833 A1 | 5/2008 | | |
| FR | 2936572 A1 | 4/2010 | | |
| JP | 60090973 A * | 5/1985 | | F02M 25/06 |
| JP | 08-144868 | 6/1996 | | |
| JP | 3668445 B2 * | 7/2005 | | F02M 25/06 |
| JP | 2007113482 A * | 5/2007 | | |
| WO | WO2008061694 A1 | 5/2008 | | |
| WO | WO 2010071013 A1 * | 6/2010 | | F02M 25/07 |

OTHER PUBLICATIONS

English language abstract for FR2908833 extracted from espacenet.com database Jul. 18, 2013, 2 pages.

English language abstract and translation for FR2936572 extracted from espacenet.com database Jul. 18, 2013, 35 pages.

English language abstract and translation for JP 08-144868 extracted from espacenet.com database Jul. 18, 2013, 26 pages.

International Search Report for Application PCT/EP2011/069576 dated Dec. 22, 2011, 7 pages.

* cited by examiner

GAS DISTRIBUTION MANIFOLD AND CORRESPONDING GAS INTAKE MODULE

RELATED APPLICATIONS

This application is the National Stage of International Patent Application No. PCT/EP2011/069576, filed on Nov. 7, 2011, which claims priority to and all the advantages of French Patent Application No. FR 10/59205, filed on Nov. 8, 2010, the content of which is incorporated herein by reference.

The present invention relates to a manifold for distributing gases into intake ducts of a motor vehicle combustion engine. It also relates to a gas intake module comprising such a manifold.

A motor vehicle combustion engine comprises a combustion chamber, generally formed by a plurality of cylinders, in which a mixture of oxidant and fuel is burned to generate the work of the engine. The gases taken into the combustion chamber are referred to as intake gases.

In certain cases, these intake gases must be cooled before being introduced into the combustion chamber; this function is performed by a heat exchanger, which is a cooler.

In order to reduce polluting emissions, it is also known practice to introduce, into the flow of intake gases, so-called "recirculated" exhaust gases. These are exhaust gases taken downstream of the combustion chamber in order to be rerouted (recirculated) toward the flow of intake gases, upstream of the combustion chamber. For that purpose, it has already been proposed to introduce the recirculated exhaust gases via one or more introduction points formed in a gas intake pipe extending between the intake gas cooler and the engine, in order that the recirculated exhaust gases mix with the intake gases.

A current trend aims to bring the heat exchanger as close as possible to the engine.

To this end, patent application FR2908833 proposes a gas intake device in which the heat exchanger and the gas intake manifold are integrated into a unitary module intended to be fixed to the cylinder head of the engine.

However, this device is especially adapted to engines having intake ducts distributed in a single line and less so to engines having intake ducts distributed in a plurality of lines.

The present invention aims to overcome this disadvantage.

Accordingly, the invention relates first of all to a manifold for distributing gases into intake ducts of a motor vehicle combustion engine, said intake ducts being distributed in at least two distant groups, each duct of one group supplying one and the same cylinder of the engine as a duct of the other group, said manifold comprising:

a manifold casing through which a flow of intake gases can flow;
an injection duct for injecting a flow of recirculated exhaust gases into the flow of intake gases,
the casing being capable of directing the flow of intake gases and the flow of recirculated exhaust gases toward the intake ducts of the engine and the injection duct being arranged inside the manifold casing so as to be able to be positioned between the two groups of intake ducts.

The particular arrangement of the injection duct, according to the invention, allows a good distribution of the gases in the cylinders of the engine even when there are large distances between the intake ducts of one and the same cylinder.

The manifold casing may comprise an inlet face for the flow of intake gases and an outlet face intended to be situated facing the engine. Said inlet face is intended to be secured to a heat exchanger and/or said outlet face is intended to be secured to the engine, in particular its cylinder head.

Advantageously, the manifold comprises intake orifices intended to be connected to the intake ducts.

Preferably, the intake orifices are aligned in two distinct groups and the injection duct is positioned in an intermediate position, in particular a central position, with respect to the two groups of intake orifices.

The intermediate and/or central positioning of the injection duct with respect to the two groups of intake orifices makes it possible to balance the distribution of the recirculated exhaust gases into the cylinders.

The manifold may comprise, in particular at the outlet face of the casing, intake pipes intended to be inserted into the intake ducts of the engine. The intake orifices are provided at said pipes.

Advantageously, the injection duct emanates from the outlet face of the manifold casing.

Advantageously again, the injection duct is of rectilinear shape.

Advantageously, the injection duct comprises a plurality of injection orifices oriented in the direction of the orifices and/or intake pipes. This allows a better distribution and a good mixing of the gases.

Advantageously, the injection orifices are aligned along the injection duct over at least two lines.

Preferably, the injection orifices are aligned along the injection duct over two lines in order to inject the recirculated exhaust gases in two opposite directions, in the direction of each group of intake ducts.

Advantageously, with the injection duct having two axial ends, said injection duct comprises an inlet orifice, for the flow of recirculated exhaust gases, that is situated between the two ends.

Advantageously again, the injection duct is configured so as to deflect the flow of intake gases. The outer profile of the injection duct thus has the function of a deflector in order to effectively direct the intake gases into the intake orifices and/or intake pipes.

The present invention also proposes a gas intake module in a motor vehicle combustion engine, comprising a heat exchanger and a manifold for distributing gases according to the invention.

Embodiments of the invention will now be described more precisely, but with no limitation being implied, with reference to the appended drawings, in which.

Figure 1:
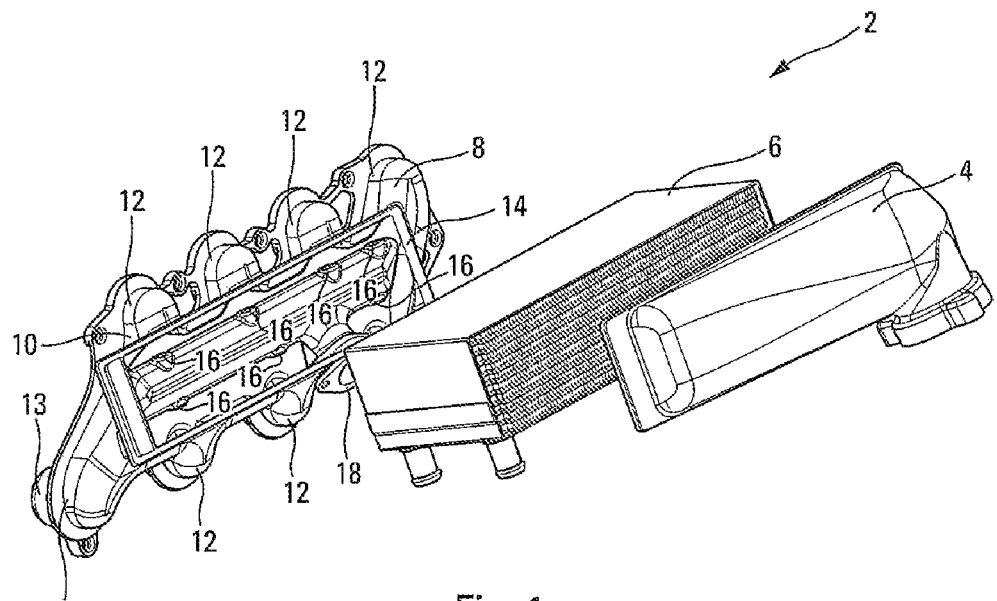
FIG. 1 represents an exploded perspective view of an intake module, according to one embodiment of the invention.

FIG. 1 represents an intake module 2. It allows the mixing of a flow of intake gases, generally fresh air, which may or may not be compressed and/or may or may not be cooled, and a flow of recirculated exhaust gases which may or may not be cooled, with the aim of admitting them into a cylinder head of a motor vehicle combustion engine, for example of the four-cylinder type, each cylinder comprising two intake valves.

The intake valves of the cylinders are associated with intake ducts, at the cylinder head, distributed into two distant groups of four ducts each.

The intake module 2 comprises an inlet box 4 for letting a flow of intake gases into a heat exchanger 6.

The heat exchanger 6 is designed to exchange heat with the flow of intake gases circulating in the exchanger. The heat exchanger 6, may, for example, be a charge air cooler capable of cooling the engine intake gases.

The heat exchanger 6 comprises, for example, a heat exchange bundle formed by a plurality of exchange elements stacked between two end plates, namely a bottom plate and a top plate. The spaces between the exchange elements of the bundle form ducts for conducting a flow of gases to be cooled, in this case the intake gases. The exchange elements of the bundle are hollow and conduct a heat-transfer fluid intended to exchange heat with the flow of gases to be cooled circulating in the fluid-conducting ducts, and thus to cool it. The exchanger is provided with inlet/outlet tubes allowing the heat-transfer fluid to enter and leave the bundle.

The heat exchanger 6 opens into a distribution manifold 8 intended to be connected to the cylinder head of the engine. The distribution manifold 8 allows a distributed intake, into the cylinder head, of the flow of gases emanating from the heat exchanger 6.

The distribution manifold 8 comprises a manifold casing 10 guiding, in this case via eight pipes, the intake gases as far as the cylinder head of the engine, through two distant groups of four intake orifices 12 each, intended to be connected to the intake ducts of the cylinder head.

Some of the intake orifices 12 are provided at projections 13 intended to be inserted inside the intake ducts. These are, in particular, the intake orifices 12 of a first of the groups, that at the bottom in the figures. These projections 13 make it possible to provide radial sealing with the cylinder head while sealing will be of the axial type at the other group of intake orifices 12.

The distribution manifold 8 also comprises an injection duct 14 for injecting a flow of recirculated exhaust gases into the flow of intake gases upstream of the cylinder head.

Advantageously, according to the invention, the injection duct 14 is arranged inside the casing 10 so as to be able to be positioned between the two groups of intake orifices 12.

According to the embodiment represented in the drawings, the injection duct 14 comprises injection means taking the form of a plurality of injection orifices 16 oriented in the direction of the intake orifices 12.

The distribution manifold 8 also comprises an intake inlet 18 for a recirculated exhaust gas flow emanating from an exhaust line of the engine.

Figure 2:
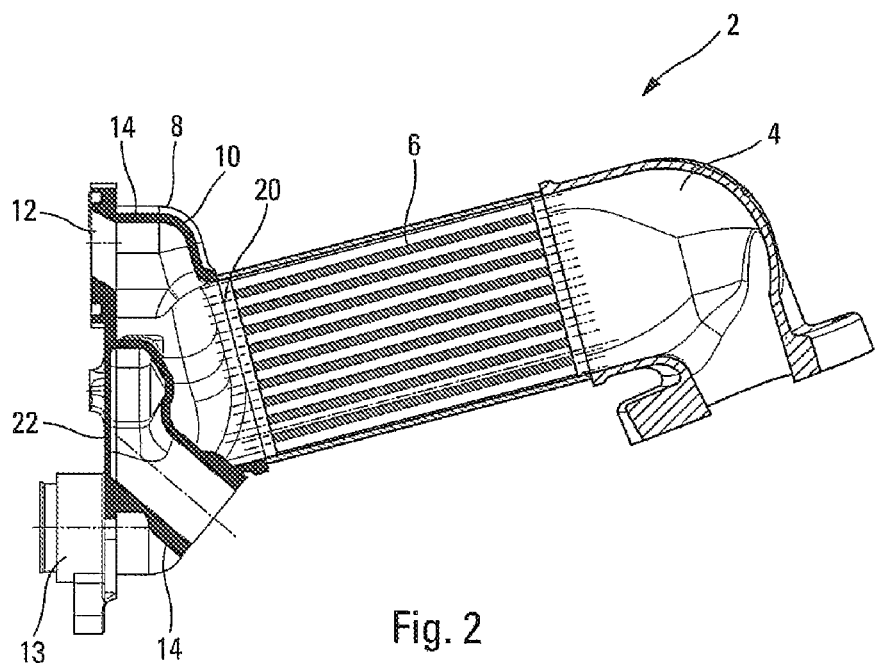
FIG. 2 represents a sectional view of the intake module of FIG. 1, the section plane being orthogonal to the outlet face of the casing of the manifold.

Advantageously, as is clearly apparent from FIG. 2, the intake module 2 takes the form of a unitary module incorporating the inlet box 4, the heat exchanger 6 and the distribution manifold 8 which are secured to one another. This module is thus intended to be fixed, as a single block, on the cylinder head of the engine.

According to a preferred embodiment of the invention, the heat exchanger 6 forms the structural element of the intake module 2 that is to say that it acts as a bearing structural element for the intake module. In particular, such an element, preferably made of metal, has mechanical characteristics allowing it to support the other elements of the module 2, which are attached to it, before fastening the module on the engine.

The exchanger comprises, for example, a housing which is open toward the inlet box 4 and the distribution manifold 8 and inside which the heat exchange bundle is placed. The inlet housing 4 and/or the manifold 8 are secured, in particular, to said housing. The inlet/outlet tubes for the heat-transfer fluid may also be fixed to said housing.

The manifold casing 10 comprises an inlet face 20 for the intake gas flow into which there opens the outlet face of the heat exchange bundle of the exchanger 6, and an outlet face 22 intended to be connected to the inlet face for the gases of the cylinder head.

Advantageously, the injection duct 14 emanates from the outlet face 22 of the manifold casing 10.

Moreover, the positioning of the injection duct 14 between the two groups of intake ducts gives it the form of a deflector for the intake gas flow so that it can be effectively directed toward the intake ducts.

Remarkably, this structure of the distribution manifold 8 of the invention therefore does not require the provision of a separate deflector.

Figure 3:
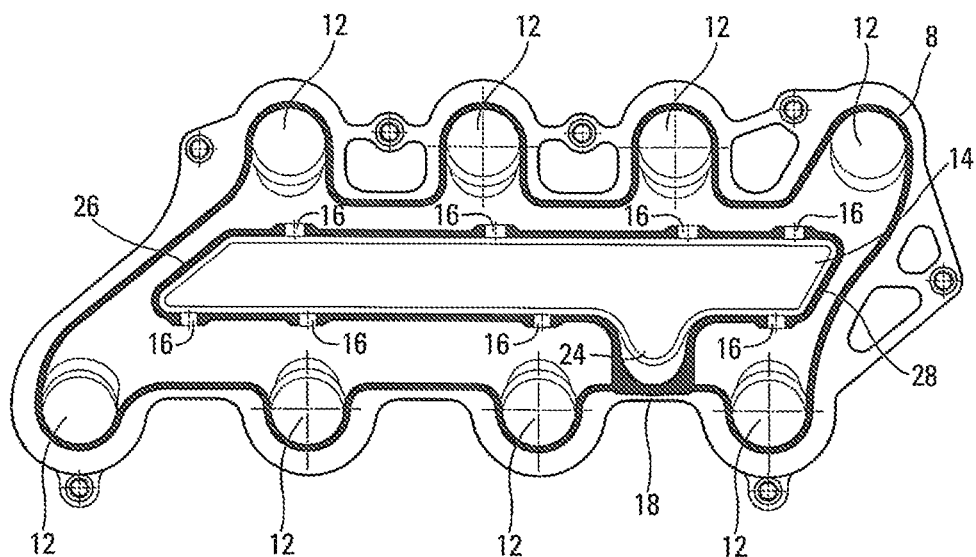
FIG. 3 represents a sectional view of a gas distribution manifold of the module of FIG. 1, the section plane being parallel to the outlet face of the casing of the manifold.

FIG. 3 illustrates the structure of the injection duct 14 in more detail.

Advantageously, the injection duct 14 is of rectilinear shape. Preferably, it is positioned in a central/median position with respect to the two groups of intake orifices 12.

The injection orifices 16, the number and the dimensions of which are not limited, are aligned along the injection duct 14 over two lines so as to inject the recirculated exhaust gases in the direction of each group of intake ducts.

However, it would be possible to have variants in which the injection orifices 16 are distributed over more than two lines, for example in a spiral or in a staggered formation, etc.

Furthermore, the injection duct 14 comprises an inlet orifice 24 corresponding to the intake inlet 18 for the flow of recirculated exhaust gases. Preferably, the inlet orifice 24 is situated between the two axial ends 26 and 28 of the injection duct 14. Here, it is connected to the injection duct 14 at a distance from one of the ends of said duct that is substantially equal to a quarter of the length of the injection duct 14.

Figure 4:
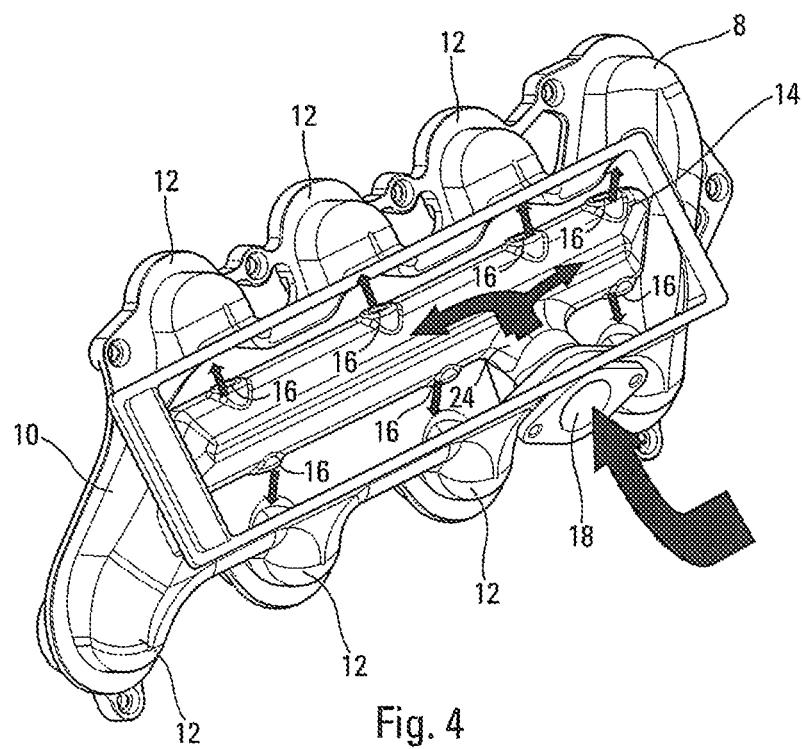
FIG. 4 represents a perspective view of the gas distribution manifold of the module of FIG. 1.

The solid arrows of FIG. 4 illustrate the circulation of the recirculated gases from the intake inlet 18 toward the injection duct 14 while passing through the inlet orifice 24. Then, the gases are injected from the injection orifices 16 toward the intake orifices 12, for example in a direction substantially orthogonal to the flow of intake gases, thereby promoting the mixing.

The invention claimed is:

1. A manifold (8) for distributing gases into intake ducts of a motor vehicle combustion engine, the intake ducts being distributed in at least two distant groups, each duct of one group supplying the same cylinder of the engine as a duct of the other group, said manifold (8) comprising:
   an intake inlet (18) for a recirculated exhaust gas flow emanating from an exhaust line of the engine;
   a manifold casing (10) through which a flow of intake gases can flow, the manifold casing (10) comprising an inlet face (20) for the flow of intake gases and an outlet face (22) situated facing the engine;
   an injection duct (14) emanating from the outlet face (22) of the manifold casing (10) for injecting the flow of recirculated exhaust gases into the flow of intake gases, the injection duct (14) having two axial ends (26, 28) in which the injection duct (14) is of rectilinear shape between the two axial ends (26, 28), the injection duct (14) also including an inlet orifice (24) corresponding to the intake inlet (18) that is situated between the two axial ends (26, 28), and
the manifold casing (10) directing the flow of intake gases and the flow of recirculated exhaust gases toward the intake ducts of the engine, and the injection duct (14) being arranged inside the manifold casing (10) so as to be able to be positioned between the two distant groups of intake ducts.

2. The manifold as claimed in claim 1, further comprising intake orifices (12) intended to be connected to the intake ducts.

3. The manifold as claimed in claim 2, in which the intake orifices (12) are aligned in two distant groups and the injection duct (14) is positioned in an intermediate position with respect to the two groups of intake orifices (12).

4. The manifold as claimed in claim 3, in which the manifold casing (10) comprises an inlet face (20) for the flow of intake gases and an outlet face (22) intended to be situated facing the engine, and the injection duct (14) emanates from the outlet face (22) of the manifold casing (10).

5. The manifold as claimed in claim 1, in which the injection duct (14) comprises a plurality of injection orifices (16) oriented in the direction of the intake orifices (12).

6. The manifold as claimed in claim 5, in which the injection orifices (16) are aligned along the injection duct (14) over at least two lines.

7. The manifold as claimed in claim 6, in which the injection orifices (16) are aligned along the injection duct (14) over two lines in order to inject the recirculated exhaust gases in two opposite directions.

8. The manifold as claimed in claim 1, in which the injection orifices (16) are aligned along the injection duct (14) over at least two lines.

9. The manifold as claimed in claim 8, in which the injection orifices (16) are aligned along the injection duct (14) over two lines in order to inject the recirculated exhaust gases in two opposite directions.

10. The manifold as claimed in claim 9, in which the recirculated exhaust gas is injected from the injection duct (14) through the injection orifices (16) in a direction substantially orthogonal to the flow of intake gases.

11. The manifold as claimed in claim 1, wherein the injection duct (14) is configured so as to deflect the flow of intake gases.

12. A gas intake module (2) in a motor vehicle combustion engine, comprising a heat exchanger (6) and a manifold (8) for distributing gases as claimed in claim 1.

13. The manifold as claimed in claim 1, in which the intake orifices (12) of one of the two distant groups are provided with projections (13) to allow radial sealing with a cylinder head of the cylinder of the engine.

14. The manifold as claimed in claim 1, in which the inlet orifice (24) is situated at a distance from one of the two axial ends (26, 28) substantially equal to a quarter of the length of the injection duct (14).

15. The manifold as claimed in claim 1, in which the recirculated exhaust gas is injected in a direction substantially orthogonal to the flow of intake gases.

16. The manifold as claimed in claim 1, wherein the inlet orifice (24) is situated such that the recirculated exhaust gas flowing from the inlet intake (18) through the inlet orifice (24) flows in a direction orthogonal to the length of the injection duct (14) defined between the two axial ends (26, 28).

* * * * *